Figure 1:
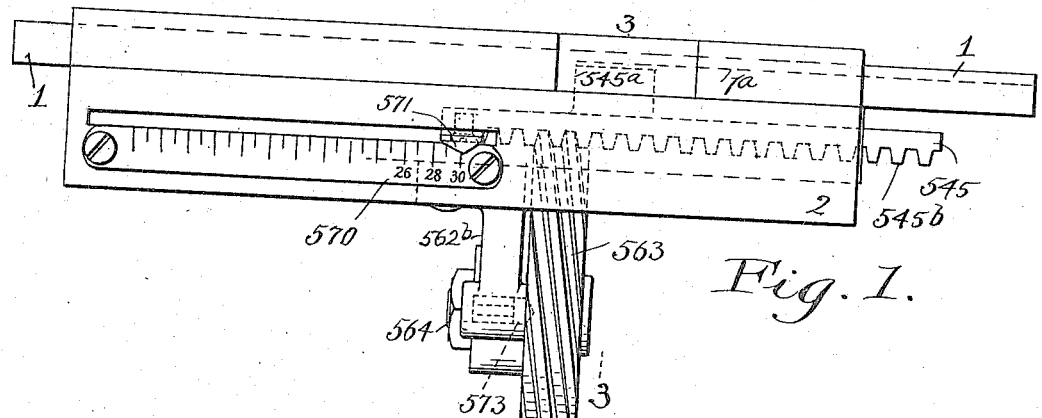

D. PETRI-PALMEDO.
LINE CLAMPING MECHANISM FOR TYPOGRAPHIC MACHINES.
APPLICATION FILED SEPT. 20, 1915.

1,234,082.

Patented July 17, 1917.

Inventor
David Petri-Palmedo
By Thurston & Riva
Attorneys.

UNITED STATES PATENT OFFICE.

DAVID PETRI-PALMEDO, OF BRIDGEPORT, CONNECTICUT, ASSIGNOR TO ELECTRIC COMPOSITOR COMPANY, OF NEW YORK, N. Y., A CORPORATION OF NEW JERSEY.

LINE-CLAMPING MECHANISM FOR TYPOGRAPHIC MACHINES.

1,234,082.

Specification of Letters Patent. Patented July 17, 1917.

Application filed September 20, 1915. Serial No. 51,513.

*To all whom it may concern:*

Be it known that I, DAVID PETRI-PALMEDO, a citizen of the United States, residing at Bridgeport, in the county of Fairfield and State of Connecticut, have invented a certain new and useful Improvement in Line-Clamping Mechanism for Typographic Machines, of which the following is a full, clear, and exact description.

It is common practice, in circulating matrix typographic machines, to put a line made up of matrices and expanding space bars between two end clamps, and to then expand the space bars, and thereby lengthen the line until the two ends thereof are pressed tightly against said end clamps. One of these end clamps is commonly fixed. The other is movable, but is associated with mechanism by which it may be made to come to rest temporarily for the purposes of justification, at exactly the required distance from the fixed end clamp. Usually the movable end clamp is also associated with mechanism by which it may be moved momentarily away from the fixed end clamp and then back to its original position to facilitate the justification of the line by means of the expanding space bands; and also by means of which it can be moved away from the fixed end clamp far enough to unclamp the line and permit its removal and transfer to the distributing mechanism.

The mechanism for moving the end clamp to and away from its clamping position has a fixed cycle of movement; but nevertheless there must be means by which the movable end clamp may be made to come to rest, for justification purposes, at various precise distances from the fixed end clamp, or otherwise matrix lines of different lengths could not be justified.

To accomplish this it is common to employ one member which is movable toward and from the fixed end clamp and associated mechanism having a fixed path by which said member may be so moved. The movable end clamp has an adjustable connection with this movable member whereby when said movable member comes to rest in one end of its path of travel, the movable end clamp may be at any desired distance from the fixed end clamp.

It is, however, clearly desirable that the machine operator be able to quickly and accurately so position the movable end clamp with respect to said movable member, that a line justified between the fixed and movable end clamps shall be of the desired length.

The object of this invention is to enable this to be done; and the invention consists in the construction and combination of parts shown in the drawing and hereinafter described and pointed out in the appended claims.

Figure 2:
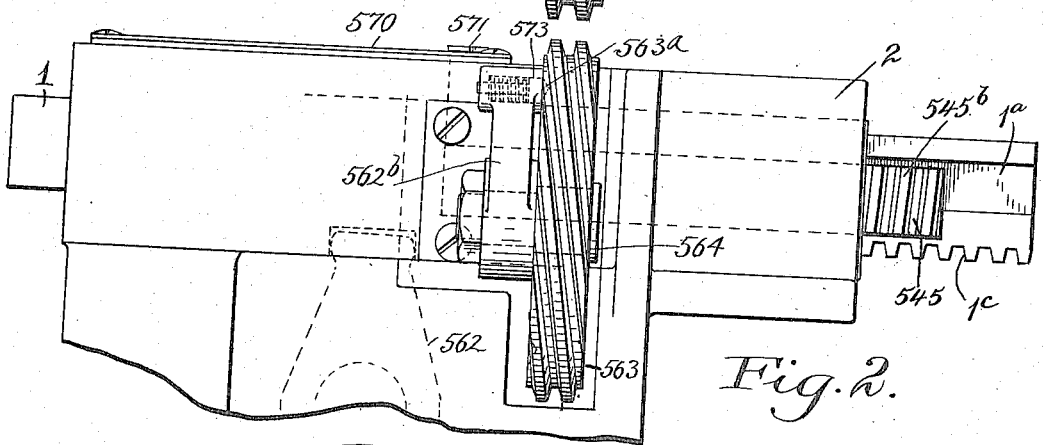
Figure 3:
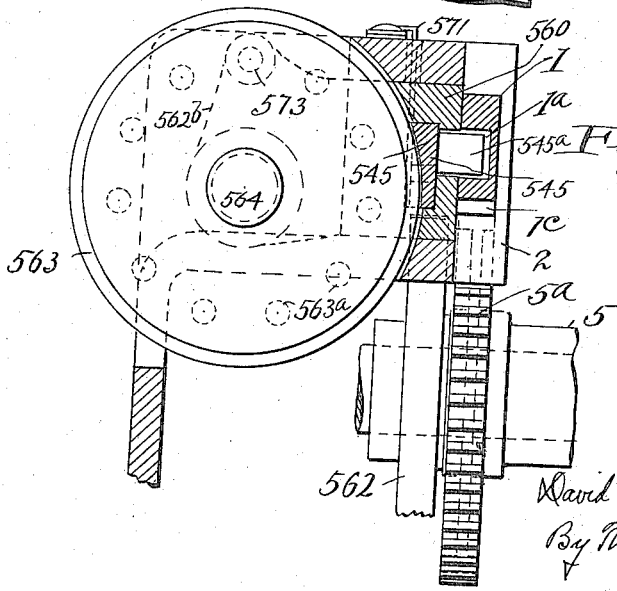

In the drawings, Figure 1 is a plan elevation of the mechanism in which the present invention is embodied; Fig. 2 is a front view thereof, and Fig. 3 is a vertical section in the plane of line 3—3 on Fig. 1.

The invention is shown in a form which especially adapts it for use in and as a part of the line clamping mechanism which forms the subject matter of the Palmedo and Goddard Patent, No. 1,174,610, granted Mar. 7, 1916; but obviously the invention, in its broader aspect, is not restricted to this particular line clamping mechanism.

Referring to the parts by reference characters, 1 represents the movable end clamp. This is mounted on a fixed part 2 of the frame work of the machine so that it may slide endwise in a fixed path toward and away from the fixed end clamp, which is shown diagrammatically in said prior application. The movable end clamp may have rack teeth $1^c$ on its lower edge for engagement with the gear $5^a$ which is fixed to the sleeve 5,—which sleeve is capable of being turned backward and forward by suitable mechanism, as for example, that which is shown in said prior application.

In the front face of said sliding end clamp is a horizontal groove $1^a$ which extends from its right end a suitable distance,—the end of said groove furnishing a shoulder for engagement with the line stop $545^a$. This line stop is a lug which projects rearward from the line stop adjusting slide 545 into said groove $1^a$.

This line stop adjusting slide is mounted on the line stop slide 560 which in turn is mounted on the frame member 2. These three slides, namely, the end clamp, the line stop slide, and the line stop adjusting slide, are all movable in parallel paths.

All of the foregoing parts are substantially like the corresponding parts shown in said prior application, and may be associated with, and moved by, the mechanism provided for that purpose, as shown in said prior application,—said mechanism including a lever 562 whose upper end, as shown in the drawing, enters a notch in the lower edge of the line stop slide.

Fixed to and projecting forward from the line stop slide 560 is a bracket 562^b on which a slow pitch worm wheel 563 is mounted by means of the stud 564. This worm wheel engages the teeth 545^b formed on the front face of the line stop adjusting slide 545. By turning this worm wheel the line stop adjusting slide may be moved in either direction relatively to the line stop slide. In order that the operator may be able to move said line stop slide to any desired position, a graduated bar 570 is fixed to the fixed frame work 2; and a pointer 571 is fixed to the line stop adjusting slide, and is carried over said graduated bar. The graduations on the bar are of such character that they will show the operator when he has adjusted the line stop adjusting slide to the required position for justifying a matrix line of any desired length.

A spring plunger 573 is mounted on the bracket 562^b and in such position that it may be engaged in any of several accurately placed indexing recesses 563^a in the left face of the worm wheel. This spring plunger is not intended to serve as a latch or lock to prevent the worm wheel from turning, because that is not necessary, the teeth of said worm wheel being so slow that no amount of back pressure on the line stop adjusting slide can turn this wheel. The plunger and recesses are merely indexing devices which aid the operator in accurately positioning said worm wheel,—and are merely adjunctive to the gage bar and pointer.

From the foregoing it is clear that whenever the operator wishes to readjust this clamping mechanism so that it may cause the production of justified lines of any required length he has merely to take hold of this worm wheel and turn it until the pointer comes opposite that graduation on the bar which indicates the required line length.

As before stated, the invention is shown associated with the particular line clamping mechanism which is shown and described in the prior Patent No. 1,174,610. It is one of the characteristics of that clamping mechanism that the movable end clamp is capable of moving toward the fixed end clamp so as to thereby clamp the occasional short lines which are formed in composition. In order that the movable end clamp may be capable of so moving it is necessary that it may be disconnected from the so-called line stop adjusting slide, and it is necessary that these two parts have engageable shoulders by which to limit the possible movement of the movable end clamp away from the fixed end clamp. If, however, one in constructing mechanism of this sort, did not desire to endow it with the capacity for clamping short lines, the movable end clamp and the so-called line stop adjusting slide might well be permanently connected together. Therefore, it is intended that the appended claims shall be construed to cover the combination of parts which they severally recite, whether the end clamp has or has not the capacity to move independently of the line stop adjusting slide.

Having described my invention, I claim:

1. In line clamping mechanism for type bar making machines, the combination of a line stop slide normally occupying a certain position and movable away from and back to said position, a movable end clamp, a line stop adjusting slide which controls the position of the end clamp while a full line is being justified, and a slow pitch worm wheel mounted on the line stop slide,—the line stop adjusting slide being formed with teeth with which said worm wheel engages.

2. In line clamping mechanism for type bar making machines, the combination of a line stop slide normally occupying a certain position and movable away from and back to said position, a movable end clamp, a line stop adjusting slide which controls the position of the end clamp while a full line is being justified, a slow pitch worm wheel mounted on the line stop slide,—the line stop adjusting slide being formed with teeth with which said worm wheel engages, a graduated bar which is fixed in position while the line stop adjusting slide is being moved relative to the line stop slide, and a coöperating pointer fixed to the line stop adjusting slide.

In testimony whereof, I hereunto affix my signature in the presence of two witnesses.

DAVID PETRI-PALMEDO.

Witnesses:
 EDWARD F. GODDARD,
 FRED. J. MARRE.

Copies of this patent may be obtained for five cents each, by addressing the "Commissioner of Patents, Washington, D. C."